United States Patent
Pinter et al.

[19]

[11] Patent Number: 5,924,017
[45] Date of Patent: Jul. 13, 1999

[54] METHOD AND SYSTEM FOR ADAPTIVELY SETTING WAKE-UP INTERVALS IN PAGING DEVICES

[75] Inventors: Gregory J. Pinter, Brandon; Masood Garahi, Madison; William D. Hays, Jackson, all of Miss.

[73] Assignee: SkyTel Communications, Inc., Jackson, Miss.

[21] Appl. No.: 08/707,512

[22] Filed: Sep. 4, 1996

[51] Int. Cl.⁶ ........................................ H04B 7/00
[52] U.S. Cl. .................. 455/38.3; 455/343; 340/825.44; 370/311
[58] Field of Search .................. 455/343, 38.3, 455/574, 458, 31.3; 370/311, 312, 313, 314; 340/825.44, 311.1

[56] References Cited

U.S. PATENT DOCUMENTS

| | | | |
|---|---|---|---|
| 4,860,005 | 8/1989 | DeLuca et al. ..................... | 340/825.44 |
| 4,977,611 | 12/1990 | Maru ........................................ | 455/161 |
| 5,128,938 | 7/1992 | Borras ..................................... | 455/343 |
| 5,301,225 | 4/1994 | Suzuki et al. ........................... | 455/343 |
| 5,535,207 | 7/1996 | Dupont .................................... | 455/38.3 |

Primary Examiner—Wellington Chin
Assistant Examiner—Lee Nguyen
Attorney, Agent, or Firm—Finnegan, Henderson, Farabow, Garrett & Dunner, L.L.P.

[57] ABSTRACT

In a paging system, a central paging station determines a preferred amount of time, or "sleep value," that a paging device is to be inactive during a paging cycle based upon the volume of page messages that paging device historically receives during given time periods. After determining a preferred sleep value, the central paging station creates and transmits a wake-up interval page message. The paging device receives the wake-up interval page message and changes its wake-up interval to correspond to the one contained in the received page message.

2 Claims, 7 Drawing Sheets

PAGING DEVICE 110

— 300

| TIME PERIOD BEGINNING: | AVERAGE NUMBER OF PAGE MESSAGES TRANSMITTED: |
|---|---|
| 12:00 a.m. | 0 |
| 4:00 a.m. | 0 |
| 8:00 a.m. | 4 |
| 12:00 p.m. | 12 |
| 4:00 p.m. | 3 |
| 8:00 p.m. | 0 |

FIG. 3B

PAGING DEVICE 110

— 330

| TIME PERIOD BEGINNING: | CURRENT WAKE-UP INTERVAL: | CURRENT SLEEP VALUE: |
|---|---|---|
| 12:00 a.m. | FRAME 3 OF EVERY 2 CYCLES | 29/30 |
| 4:00 a.m. | FRAME 3 OF EVERY 2 CYCLES | 29/30 |
| 8:00 a.m. | FRAME 3 OF EVERY CYCLE | 14/15 |
| 12:00 p.m. | FRAME 3 OF EVERY 11 CYCLES | 13/15 |
| 4:00 p.m. | FRAME 3 OF EVERY CYCLE | 14/15 |
| 8:00 p.m. | FRAME 3 OF EVERY 2 CYCLES | 14/15 |

FIG. 7

METHOD AND SYSTEM FOR ADAPTIVELY SETTING WAKE-UP INTERVALS IN PAGING DEVICES

BACKGROUND OF THE INVENTION

1. Field of the Invention

The present invention relates generally to paging methods, devices, and systems. More particularly, the present invention relates to a method and system for adaptively setting wake-up intervals in a paging device.

2. Description of the Related Art

Subscribers to today's paging services can receive messages any time of the day, so long as their pagers are active (i.e., turned on). Active pagers monitor page messages transmitted from central paging stations and receive those messages containing recognizable address codes. Inactive pagers, on the contrary, do not receive page messages. Accordingly, to avoid missing any page messages, many subscribers prefer to keep their pagers active all the time. Since pagers consume power while they are active, however, pagers that are active all the time quickly drain batteries. The result is frequent battery replacement, which is both inconvenient and costly.

To conserve battery power, most pagers are equipped with a conventional power-saving feature that automatically causes the pagers to be turned on and off periodically to "wake-up" and look for pages only during a predefined interval—the wake-up interval. The central paging stations typically keep track of the wake-up interval(s) for each pager and only transmit page messages to those pagers during their respective wake-up intervals. In this way, pagers consume a fraction of the power they would otherwise use, without missing any page messages.

Although this feature conserves some power in these pagers, valuable power is still wasted. The pagers uniformly become active during their respective wake-up intervals throughout the day according to their programming. However, there may be times of the day when these pagers receive few or no page messages, during which times these pagers remain substantially idle, though active, and, thus, unnecessarily waste power. For instance, some pagers may receive a high volume of page messages during business hours (i.e., between 9:00 a.m. and 5:00 p.m.) and receive no page messages during non-business hours. The conventional power-saving feature would unnecessarily cause these pagers to become active during non-business hours with the same frequency as during business hours, thereby wasting battery power.

SUMMARY OF THE INVENTION

Accordingly, the present invention is directed to paging methods and devices that substantially obviate one or more of the problems due to limitations and disadvantages of the related art.

In one aspect, the invention includes a paging device comprising means for receiving a page message, the page message including a wake-up interval page message containing a new wake-up interval; means for storing a wake-up interval; means for updating the wake-up interval stored in the storing means with the new wake-up interval contained in the received page message; and means for activating the paging device in accordance with the wake-up interval stored in the storing means.

In another aspect, the invention includes a central paging station comprising means for storing subscriber profiles representative of message patterns of subscribers; means for determining a preferred sleep value in accordance with the subscriber profiles stored in the storing means; means for creating a wake-up interval page message containing data representative of a new wake-up interval, based upon the preferred sleep value; and means for transmitting the wake-up interval page message.

In a further aspect, the invention includes a paging system, comprising a central paging station and a paging device. The central paging station comprises means for storing subscriber profiles representative of message patterns of subscribers; means for determining a preferred sleep value in accordance with the subscriber profiles stored in the storing means; means for creating a wake-up interval page message containing a new wake-up interval, based upon the preferred sleep value; and means for transmitting the wake-up interval page message. The paging device comprises means for receiving the wake-up interval page message; means for storing data representative of a wake-up interval; means for updating the wake-up interval stored in the storing means with the new wake-up interval contained in the received page message; and means for activating the paging device in accordance with the wake-up interval stored in the storing means.

In yet a further aspect, the invention includes, in a paging system, a method comprising the steps of determining a preferred sleep value based upon customer profiles; creating a wake-up interval page message containing a new wake-up interval, in accordance with the preferred sleep value; transmitting the wake-up interval page message; receiving the wake-up interval page message at a paging device; and updating a wake-up interval stored in the paging device with the new wake-up interval contained in the received page message.

It is to be understood that both the foregoing general description and the following detailed description are exemplary and explanatory and are intended to provide further explanation of the invention as claimed.

BRIEF DESCRIPTION OF DRAWINGS

The accompanying drawings are included to provide a further understanding of the invention and are incorporated in and constitute a part of this specification, illustrate several embodiments of the invention, and, together with the description, serve to explain the principles of the invention.

In the drawings.

DETAILED DESCRIPTION OF THE INVENTION

Figure 1:
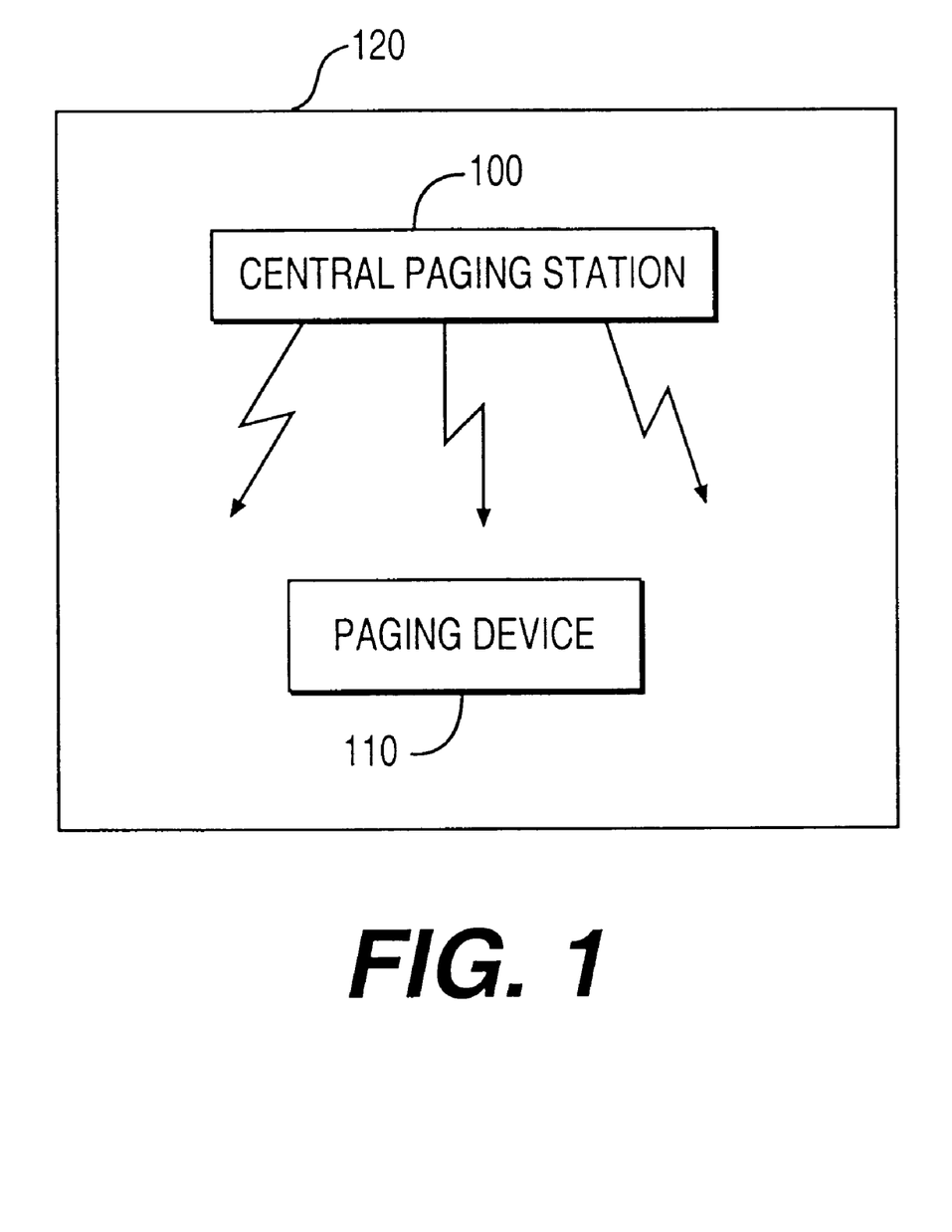
FIG. 1 illustrates a block diagram of a paging system, in accordance with one embodiment of the invention.

FIG. 1 illustrates a block diagram of a paging system 120, in accordance with one embodiment of the invention. As shown in FIG. 1, paging system 120 includes central paging station 100 and paging device 110. While FIG. 1 only shows a single central paging station and a single paging device, it is understood that paging system 120 can include additional central paging stations and many paging devices.

The paging system 120 preferably operates in accordance with a conventional repeating paging cycle divided into equal time frames. The paging cycle may be, for example, two minutes long and may be divided into 12 frames lasting 10 seconds each. For the purpose of facilitating a more consistent and clear understanding of the invention, unless otherwise stated, the paging system 120, paging device 110, and central paging station 100 will be described in connection with the above-described two-minute paging cycle throughout the remainder of this specification.

In accordance with conventional techniques, the paging device 110 becomes active during a specified frame(s) of a repeating paging cycle(s), referred to as the "wake-up interval(s)," and is inactive or sleeps during the remaining frames of the paging cycle(s). A "sleep value" of paging device 110 represents the percentage of time that the paging device 110 is sleeping within a paging cycle(s). Thus, for example, the paging device 110 may wake-up for the third frame of every 2-minute paging cycle, in which case its sleep value is 11/12 (i.e., paging device is inactive (sleeping) eleven out of twelve frames of every paging cycle). By way of another example, paging device 110 may wake-up for the third frame of every other paging cycle, in which case its sleep value is 23/24 (i.e., paging device 110 is inactive twenty-three frames out of twenty-four frames of every two paging cycles). In still another example, paging device 100 may wake-up for the third and eighth frames of every paging cycle, in which case the sleep value is 10/12 (i.e., inactive ten frames out of twelve). During its wake-up interval(s), paging device 110 monitors a designated paging frequency for page messages and only receives those page messages containing recognizable address codes, in accordance with conventional techniques.

In one embodiment of the invention, paging device 100 stores a set of wake-up intervals and becomes active in accordance with the stored wake-up interval(s). The stored wake-up interval(s) of the paging device 110 can be changed or modified, for example, via over-the-air programming, in which case paging device 110 receives and processes a "wake-up interval page message." When such a page message is received, the paging device 110 replaces or modifies the stored wake-up intervals with the new wake-up interval (s) identified in the page message. Paging device 110 is described in greater detail below in connection with FIGS. 4 and 5.

Central paging station 100 of paging system 120 preferably stores a record of the wake-up intervals stored in the paging device 110 and other paging devices (not shown) and transmits page messages to the paging devices over the designated paging frequency during their respective wake-up intervals. Central paging station 100 also preferably stores subscriber profiles reflecting, for example, the average number of page messages a subscriber receives at different times of a day. Based on these subscriber profiles, the central paging station 100 determines whether the wake-up intervals currently stored in the subscribers' paging devices are appropriate. If not, central paging station 100 creates and transmits to the respective paging devices wake-up interval page messages containing new wake-up intervals in accordance with the respective subscriber profiles.

Figure 2:
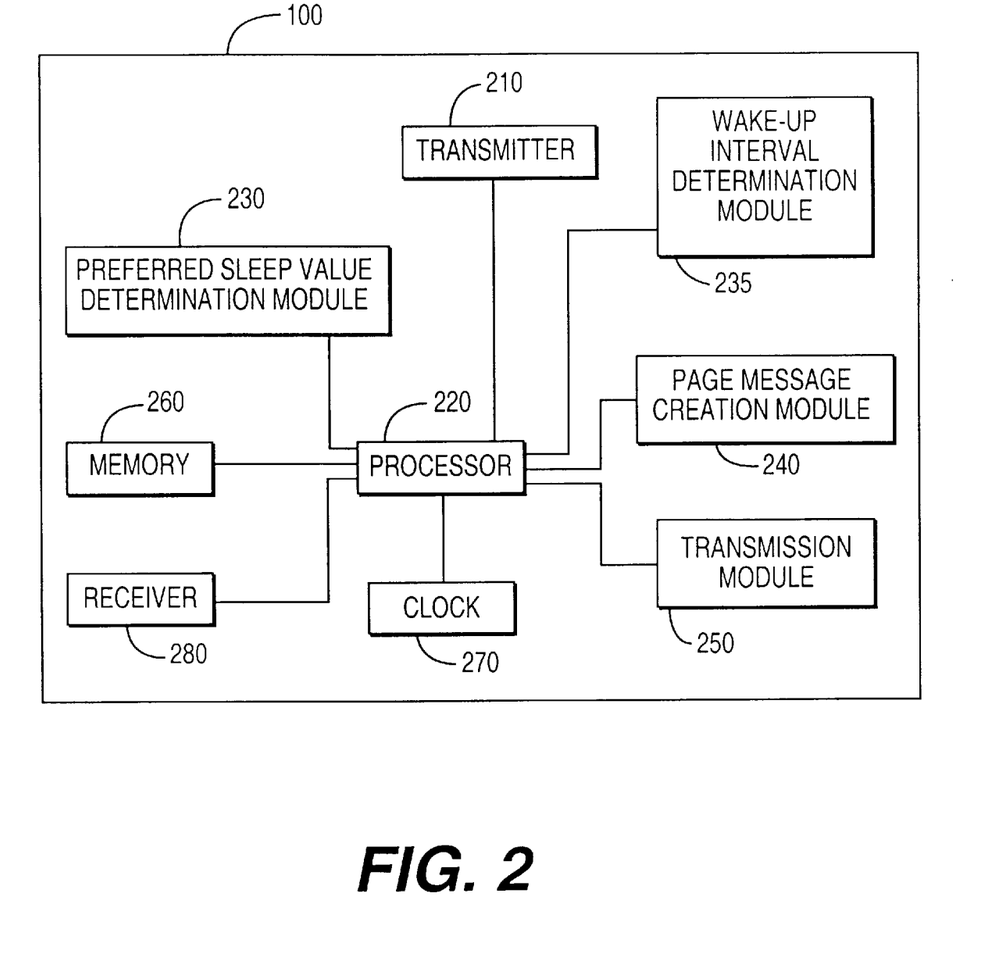
FIG. 2 illustrates a block diagram of a central paging station, in accordance with one embodiment of the invention.

The central paging station 100 is shown in greater detail in FIG. 2, which illustrates a block diagram of the central paging station 100. As shown in FIG. 2, central paging station 100 includes transmitter 210, processor 220, preferred sleep value determination (PSVD) module 230, wake-up interval determination (WUID) module 235, page message creation (PMC) module 240, transmission module 250, memory 260, clock 270, and receiver 280. The processor 220 is connected to the transmitter 210, PSVD module 230, WUID module 240, transmission module 250, memory 260, clock 270, and receiver 280.

Figure 3A:
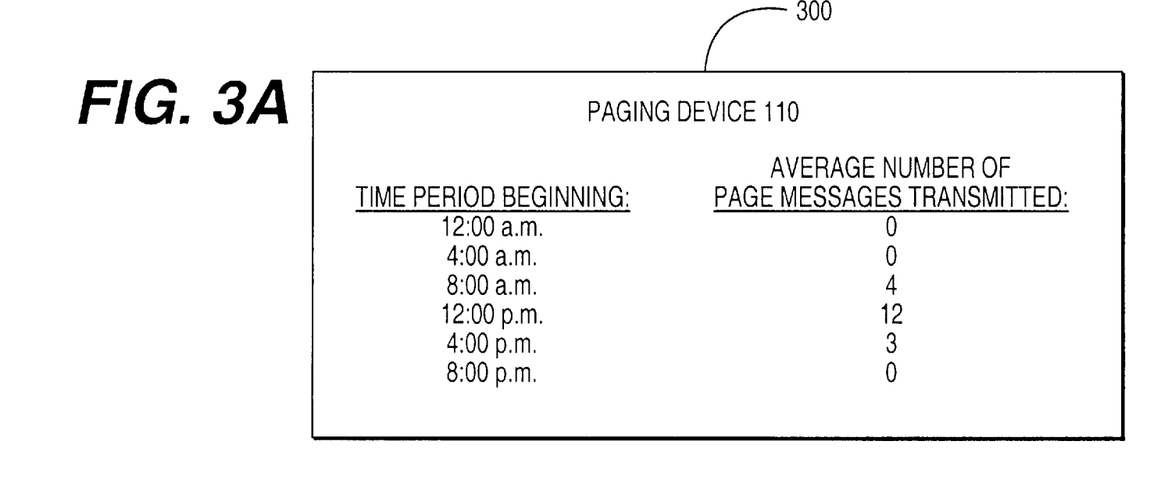
FIGS. 3A–3B illustrate examples of a subscriber profile and a table of wake-up intervals and sleep values, respectively, in accordance with one embodiment of the invention.

Memory 260 stores a plurality of subscriber profiles reflecting the message patterns of each subscriber. In one embodiment, each subscriber profile contains data representing an average volume of page messages transmitted to that subscriber's paging device 110 during different time periods of the day. FIG. 3A illustrates an example of a subscriber profile 300 corresponding to paging device 110. As shown in FIG. 3A, subscriber profile 300 preferably includes data representing six time periods, each four hours in length, beginning at 12:00 a.m., 4:00 a.m., 8:00 a.m., 12:00 p.m., 4:00 p.m., and 8:00 p.m., respectively. In addition, subscriber profile 300 preferably includes data representing an average number of page messages recently transmitted to paging device 110 during each of the respective time periods. In the exemplary subscriber profile, shown in FIG. 3A, no page messages were transmitted during the four hour time periods beginning at 12:00 a.m., 4:00 a.m., and 8:00 p.m., while an average of 4, 12, and 3 page messages were transmitted to paging device 110 during the four hour time periods beginning at 8:00 a.m., 12:00 p.m., and 4:00 p.m., respectively.

The subscriber profiles are preferably updated (as explained below) whenever a page message is transmitted to a subscriber. Preferably, the subscriber profiles reflect those page messages transmitted to paging device 110 for a period of several weeks, though the sample period could be shorter or longer.

Figure 3B:
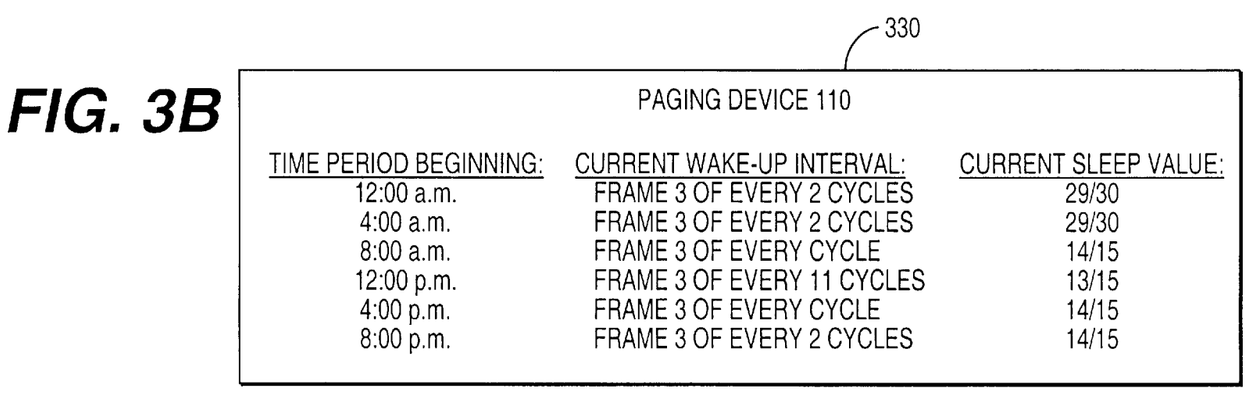

Memory 260 also stores wake-up intervals and sleep values to which paging device 110 and other paging devices are currently programmed. In one embodiment, these wake-up intervals can comprise data identifying specific frames during which the paging devices are active, i.e., awake. By way of example, FIG. 3B illustrates a table 330 containing wake-up intervals and sleep values for paging device 110 listed according to time periods. For instance, during the four hour time period beginning at 12:00 a.m., the wake-up interval stored in the paging device 110 is the third frame of every 2 paging cycles and the sleep value is then 29/30.

To update the wake-up intervals according to the changing subscriber profiles stored in memory 260, PSVD module 230 determines "preferred sleep values," representing the frequency in which the paging devices should be awake for each cycle. To this end, PSVD module 230 retrieves a subscriber profile 300 from memory 260 and uses values from the subscriber profile 300 to determine preferred sleep values, which are then transmitted to WUID module 235. Preferably, the larger the number of messages transmitted during a cycle, the lower the preferred sleep value. In one embodiment, PSVD module 230 redetermines preferred sleep values for a paging device at the end of every week to take into account message frequency changes in the subscriber profiles. It is understood, however, that PSVD module 230 could redetermine preferred sleep values more or less frequently, depending upon design considerations.

WUID module 235 receives preferred sleep values from PSVD module 230 and compares these values with corresponding sleep values contained in table 330 stored in memory 260. When a subscriber's preferred sleep value does not match the subscriber's sleep value in table 330, WUID module 235 determines a new wake-up interval(s) according to the preferred sleep value.

In selecting a new wake-up interval(s) from the preferred sleep value, WUID module 235 preferably determines the number of frames during which the paging device 110 will be active based upon the preferred sleep value. For example, if the preferred sleep value is 13/15, then the number of frames during which the paging device 110 will be awake during a paging cycle is two. Then, WUID module 235 examines table 330 to determine which frame(s) is least used as a wake-up interval in other paging devices, so that each frame has approximately the same number of total wake-up intervals amongst the many subscriber paging devices. Finally, whenever two or more wake-up intervals occur during one paging cycle (i.e., the sleep value is 13/15 or less), WUID module 235 preferably seeks to spread these wake-up intervals over the paging cycle. For example, if the paging device has two wake-up intervals in a paging cycle and frames two, three, and ten are available to be selected, then WUID module 235 preferably selects frames two and ten or frames three and ten, rather than frames two and three.

PMC module 240 creates page messages which are transmitted via transmitter 210. In one embodiment, PMC module 240 receives a new wake-up interval(s) from WUID module 235 for a paging device 110 and creates a wake-up interval page message, an example of which is shown in FIG. 4.

Figure 4:
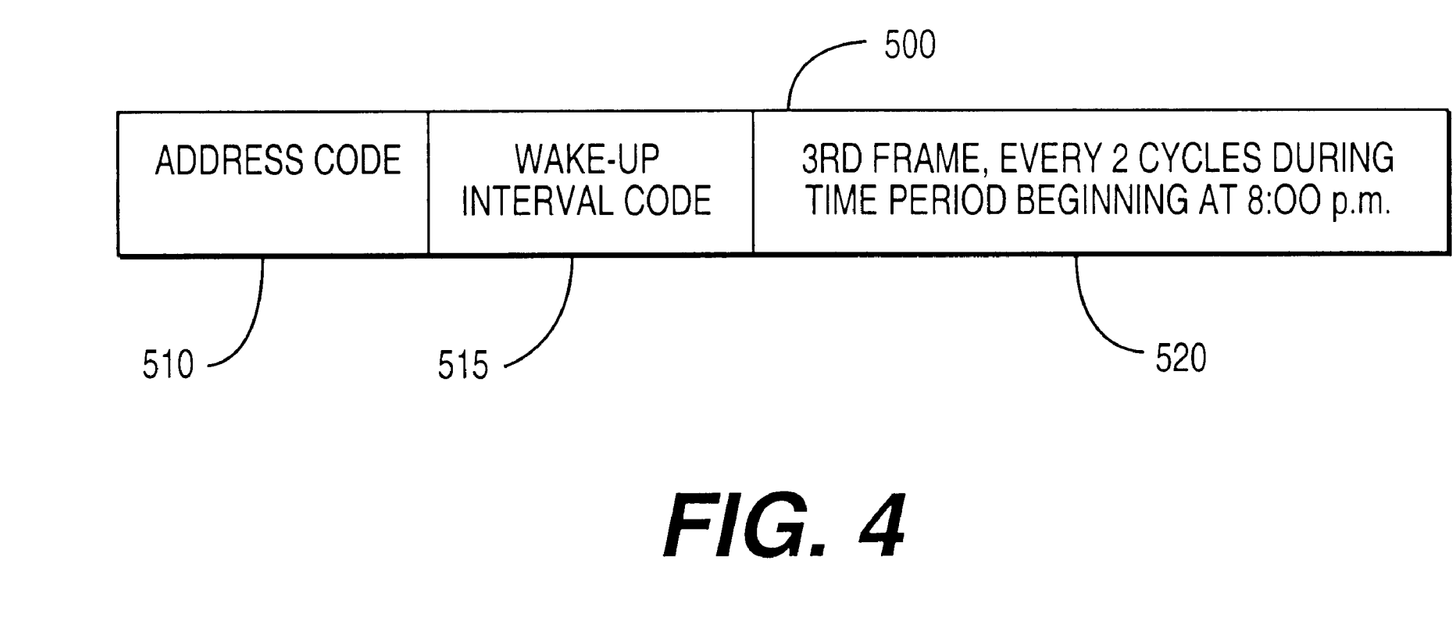
FIG. 4 illustrates a wake-up interval page message, in accordance with one embodiment of the invention.

As shown in FIG. 4, wake-up interval page message 500 preferably includes address code 510, wake-up interval code 515, and new wake-up interval 520. Address code 510 comprises a code uniquely identifying and recognizable by a paging device 110. Wake-up interval code 515 identifies page message 500 as a wake-up interval page message. New wake-up interval 520 preferably comprises data representing a wake-up interval(s) corresponding to a particular time period(s). For example, as shown in FIG. 4, new wake-up interval 520 calls for the new wake-up interval to be the third frame of every 2 cycles during a four hour time period beginning at 8:00 p.m. After creating this page message 500, PMC module 240 forwards the page message 500 to transmission module 250 for transmission to the paging device assigned the address code 510.

Transmission module 250 preferably receives page messages from PMC module 240, accesses table 330 to retrieve the appropriate wake-up intervals associated with the paging devices to which the page messages are to be transmitted, and conditions transmitter 210 to transmit these page messages during the appropriate wake-up intervals determined by clock 270. Transmitter 210 transmits the page messages generated by the central paging station 100, in accordance with conventional techniques.

In a preferred embodiment, modules 230, 235, 240, and 250 comprise software or microcode, which is executed by processor 220, and any hardware necessary to effect the execution of that microcode in accordance with conventional techniques. Also, processor 220 preferably comprises any conventional processor, such as a microprocessor, capable of executing the software or microcode and performing the functions described in connection with modules 230, 235, 240, and 250. In an alternative embodiment, modules 230, 235, 240, and 250 can be implemented in electronic logic circuitry.

Having described the central paging station 100, the paging device 110 is now described in greater detail.

Figure 5:
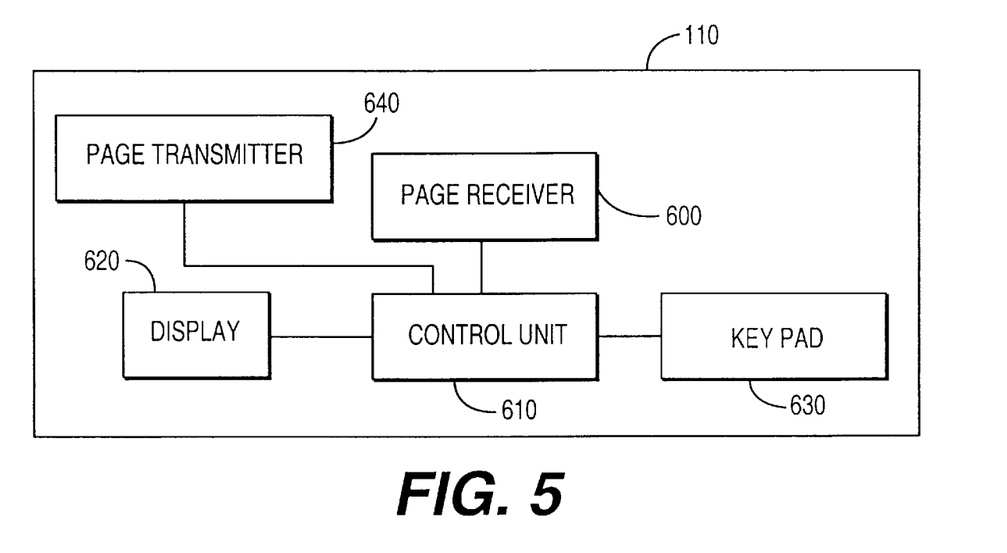
FIG. 5 illustrates a block diagram of a paging device, in accordance with one embodiment of the invention.

FIG. 5 illustrates a block diagram of paging device 110, in accordance with one embodiment of the invention. In this embodiment, paging device 110 comprises receiver 600, control unit 610, display 620, key pad 630, and transmitter 640. Control unit 610 is connected to page receiver 600, display 620, key pad 630, and transmitter 640.

Paging device 110 is similar to conventional pagers, except that paging device 110 is equipped with a power-saving feature that activates paging device 110 during an adjustably set wake-up interval(s). This predetermined wake-up interval preferably can be programmed into paging device 110 over-the-air, as discussed in greater detail below. When active (i.e., turned on), paging device 110 can receive page messages containing recognizable address codes, in accordance with conventional techniques. When inactive (i.e., turned off), paging device 110 cannot receive any page messages.

Pager receiver 600 receives page messages containing a recognizable address, and forwards the page messages to control unit 610. Page receiver 600 preferably comprises a conventional page receiver programmed to recognize at least one address uniquely identifying that page receiver and any other address codes which it is programmed to recognize.

In accordance with the present invention, page receiver 600 receives a wake-up interval page message, like the one shown in FIG. 4. When page receiver 600 receives such a page message, it is fed to control unit 610 for processing. In one embodiment, control unit 610 modifies the wake-up interval(s) stored in paging device 110 in accordance with the received wake-up interval page message. Control unit 610 is described in greater detail below in connection with FIG. 6.

A subscriber preferably accesses messages from paging device 110 through display 620 and key pad 630. Based upon the keys pressed on key pad 630, display 620 displays the messages received from control unit 610 in accordance with conventional techniques.

Figure 6:
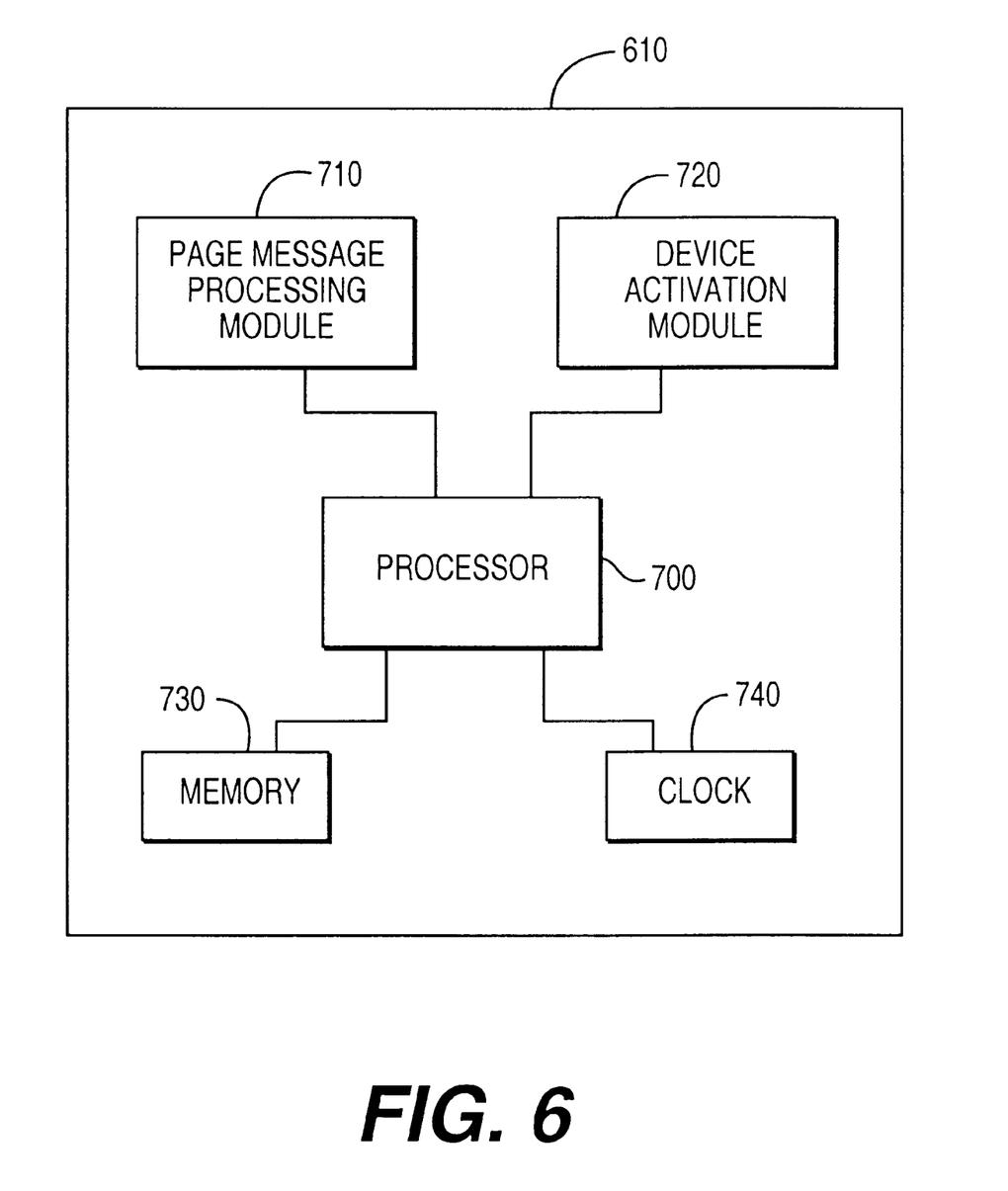
FIG. 6 illustrates a control unit of a paging device, in accordance with one embodiment of the invention.

FIG. 6 illustrates a block diagram of control unit 610, in accordance with one embodiment of the invention. In this embodiment, control unit 610 includes processor 700 connected to page message processing (PMP) module 710, device activation (DA) module 720, memory 730, and clock 740.

Memory 730 preferably stores page messages received by page receiver 600. Further, in one embodiment of the invention, memory 730 stores a wake-up interval table similar to the one shown in FIG. 3B. The wake-up interval table stored in memory 730 preferably contains at least the wake-up intervals for paging device 110 indexed according to the different time periods. The information contained in the wake-up interval table stored in memory 730 preferably matches the information contained in the table 330 stored in memory 260 of central paging station 100 (FIG. 2).

PMP module 710 preferably receives page messages received by page receiver 600 or stored in memory 730. In accordance with one embodiment of the invention, after receiving a page message, PMP module 710 identifies a wake-up interval page message 500 by recognizing the wake-up interval code 515 (FIG. 5). PMP module 710 then extracts the new wake-up interval 520 from page message 500 and updates the wake-up interval table stored in memory 730.

DA module 720 activates paging device 110 during wake-up intervals in accordance with conventional techniques. In particular, DA module 720 monitors the current time provided by clock 740 and activates paging device 110 according to the stored wake-up interval.

Modules 710 and 720 in page receiver 600 also preferably comprise software or microcode, which is executed by processor 700, and any hardware necessary to effect the execution of that microcode in accordance with conventional techniques. Processor 700 comprises any conventional processor, such as a microprocessor, capable of executing the software or microcode and performing the functions described in connection with modules 710 and 720. In an alternative embodiment, modules 710 and 720 can be implemented in electronic logic circuitry.

Figure 7:
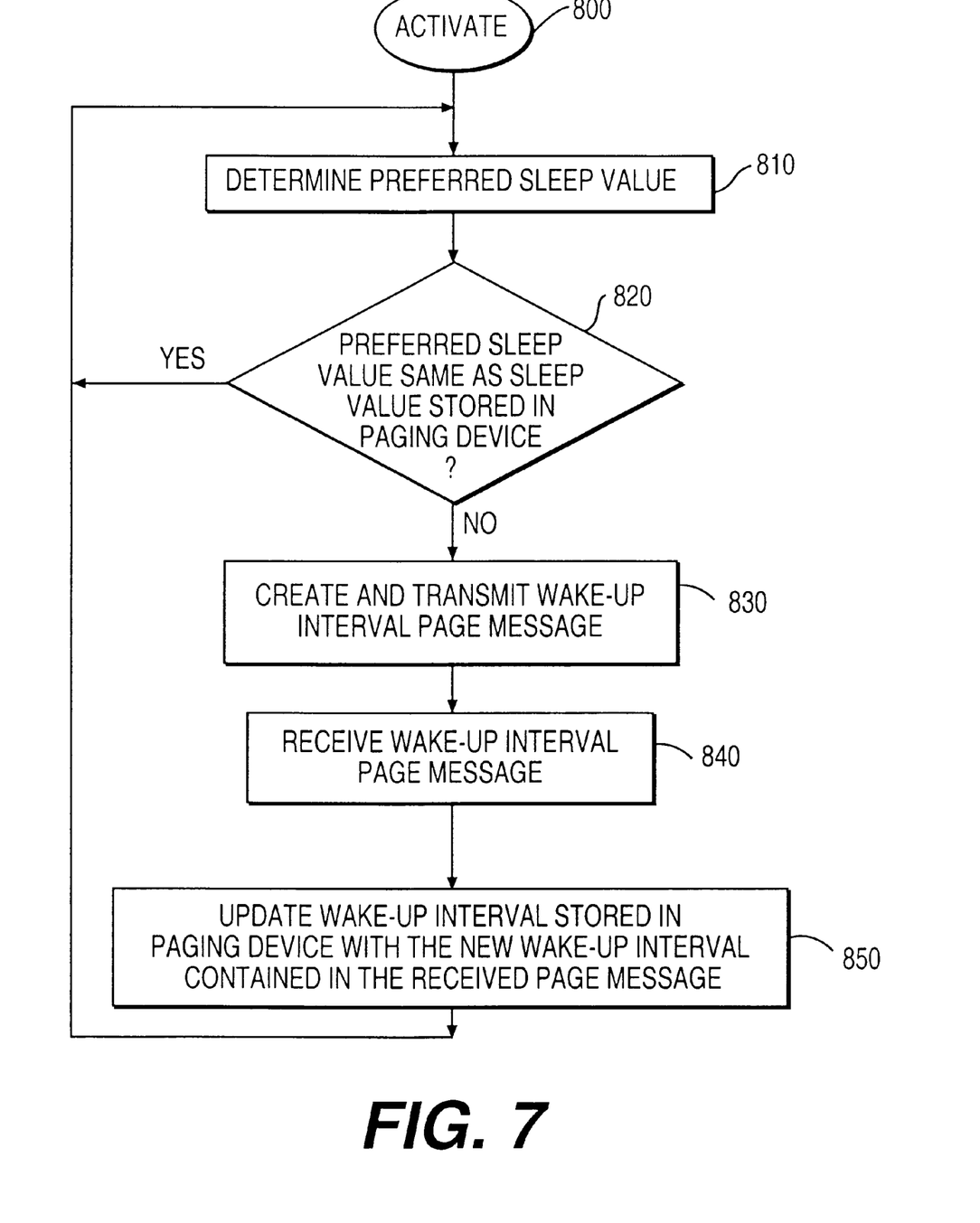
FIG. 7 illustrates a flow diagram of a paging method, in accordance with one embodiment of the invention.

To summarize the operation of the central paging station 100 and the paging device 110, FIG. 7 illustrates a flow diagram of a paging method, in accordance with one embodiment of the invention. The method illustrated in FIG. 7 is preferably carried out once a week to reflect changes in the subscribers' profiles. However, it is understood that this method could be carried out more or less frequently, depending on the parameters and requirements of the paging system 100.

In accordance with the method, when paging system 120 is activated (step 800), central paging station 100 determines a preferred sleep value for a paging device 110, based upon the subscriber's profile (step 810). As discussed above, a preferred sleep value may be determined for each of a plurality of time periods. Central paging station 100 then compares the subscribers' preferred sleep values with their sleep values stored in the paging devices 110 (step 820). If the sleep values are the same, then the method returns to step 810. If, however, the sleep values are not the same, then the central paging station 100 creates and transmits a wake-up interval paging message containing a new wake-up interval (step 830).

Paging device 110 receives the wake-up interval page message (step 840) and updates the appropriate wake-up interval stored in the paging device 110 to the new wake-up interval contained in the received page message (step 850).

The foregoing description has focussed on the application of the present invention to receive-only paging devices. However, state of the art paging devices are now being equipped with the capability to engage in two-way messaging ranging from automatically transmitting a simple signal code back to the central paging station acknowledging receipt of a page message to transmitting subscriber-initiated messages to the central paging station. If the paging device is equipped with a transmitter, such as transmitter 640 in FIG. 5, a subscriber may, in accordance with an additional feature of the present invention, be afforded the capability of setting a new wake-up interval of choice. This feature would be highly advantageous if, for example, a subscriber anticipates an unusually high level of page message activity during a time period(s) when historically little or no page message activity has occurred. A specific example of this situation would be a subscriber who normally works a day shift, but has been assigned to work a night shift on short notice. To accommodate this situation, control unit 610 (FIG. 6) of the paging device 110 would be programmed to recognize a sleep value decrease entry made by the subscriber using key pad 630. This entry is compiled by processor 700 into a message that is transmitted by the paging device transmitter 640 to the central paging station receiver 280 (FIG. 2). For example, a subscriber normally on a day shift, who is going on a night shift, may depress a key or keys of key pad 630 to enter a sleep value of 14/15 at 12:00 am. This new sleep value is included in a message that is promptly transmitted to the central paging station. This message, received by receiver 280, is routed by processor 220 to PSVD module, which acts to replace the scheduled preferred sleep value of 29/30 (in the example of FIG. 3B) with the new subscriber preferred sleep value of 14/15. This new sleep value is then used by the WUID module to determine a new wake-up interval(s), which is compiled into new wake-up interval page message (FIG. 4) by PMC module 240 and transmitted to the subscriber's paging device. The wake-up interval table stored in paging device memory 730 (FIG. 6) is updated in accordance with the received wake-up interval page message, all in the manner described above.

At 4:00 am, the subscriber may make another key pad entry to change the sleep value to 13/15, which is then messaged to the central paging station, and a new wake-up interval page message is generated back to the paging device to accordingly change the wake-up interval table stored in the paging device memory. When the subscriber's night shift ends, key pad entries may be made to increase the sleep value (decrease wake-up interval) of the paging device in anticipation of reduced page message activity, thus preserving battery power.

According to yet another feature of the present invention, processor 220 in the central paging station may be programmed to act in response to an incoming third party page request for a particular subscriber to initiate an increase in the wake-up interval for this subscriber's paging device. Specifically, processor 220, upon recognition of the subscriber's PIN included in the incoming page request, immediately interrogates the PSVD module to determine whether the current preferred sleep value is the minimum value, e.g., 13/15. If it is not, the processor sends the minimum sleep value to the WUID module, which acts to determine a new wake-up intervals) of the particular subscriber's paging device that maximizes the wake-up interval frequency. From the new wake-up interval(s), the PMC module compiles a wake-up interval page message that is transmitted to the subscriber's paging device, and the wake-up interval table in the paging device memory 730 is updated to the maximum wake-up interval frequency. In most instance, the stored wake-up interval table can be updated before the third party page request has been completed. Thus a page message can be transmitted by the central paging station and received during the wake-up interval of the subscriber's paging device occurring immediately after completion of the page request. Consequently, the third party page request can be fulfilled without apparent delay.

From the foregoing description, it is seen that the present invention has application in both one-way paging and in two-way messaging systems, such as the wireless destined network being developed by the Assignee. The wireless Destined network is described in U.S. patent application Ser. No. 08/124,219, the contents of which are incorporated herein by reference.

It will be apparent to those skilled in the art that various modifications and variations can be made in the method of the present invention without departing from the spirit or scope of the invention. Thus, it is intended that the present invention cover the modifications and variations of this invention provided they come within the scope of the appended claims and their equivalents.

What is claimed is:

1. In a paging system, a method comprising the steps of:
    determining preferred sleep values based upon subscriber profiles of subscribers;
    creating, at a central paging station, wake-up interval page messages containing new wake-up intervals in accordance with the preferred sleep values;

transmitting the wake-up interval page messages if the new wake-up intervals do not match the wake-up interval stored in the paging devices;

receiving the wake-up interval page messages at the paging devices of the subscribers;

updating the wake-up intervals stored in the paging devices with the new wake-up intervals contained in the received page messages; and accepting a page request for one of the subscribers at the paging station;

while the page request is incoming, setting the sleep value for the one subscriber to a minimum value when the subscriber's profile-based preferred sleep value is greater than the minimum value;

wherein an incoming wake-up interval page message is created in accordance with the minimum sleep value in the creating step, transmitted in the transmitting step, received at the one subscriber's paging device in the receiving step, and used to update the wake-up interval stored at the one subscriber's paging device in accordance with the received incoming wake-up interval stored at the one subscriber's paging device in accordance with the received incoming wake-up interval page message to a maximum wake-up interval frequency in the updating step.

2. In a paging system, a method comprising the steps of:

determining preferred sleep values based upon subscriber profiles of subscribers;

creating, at a central paging station, wake-up interval page messages containing new wake-up intervals in accordance with the preferred sleep values;

transmitting the wake-up interval page messages if the new wake-up intervals do not match the wake-up intervals stored in paging devices of the subscribers;

receiving the wake-up interval page messages at the paging devices of the subscribers;

updating the wake-up intervals stored in the paging devices with the new wake-up intervals contained in the received page messages; and accepting a page request for one of the subscribers at the central paging station and while the page request is incoming setting the sleep value for the one subscriber to a minimum value when the preferred sleep value is greater than the minimum value;

wherein an incoming wake-up interval page message is created in accordance with the minimum sleep value and used to update the wake-up interval stored at the one subscriber's paging device to a maximum wake-up interval frequency.

* * * * *